UNITED STATES PATENT OFFICE.

JAMES H. STEBBINS, JR., OF NEW YORK, N. Y.

PURPLE DYE-STUFF OR COLORING-MATTER.

SPECIFICATION forming part of Letters Patent No. 252,273, dated January 10, 1882.

Application filed November 26, 1881. (No specimens.)

*To all whom it may concern:*

Be it known that I, JAMES H. STEBBINS, Jr., a citizen of the United States, residing at New York, in the county and State of New York, have invented new and useful Improvements in the Manufacture of a Dark Purple Dye-Stuff or Coloring-Matter, of which the following is a specification.

This invention relates to a dark-purple dye-stuff or coloring-matter which is produced by the reaction of nitrosodimethylaniline hydrochlorate upon an acid solution of the soda salt of betanaphtholmonosulpho-acid at a temperature ranging from 110° centigrade to 121° centigrade.

In carrying out my invention I take 5.7 pounds of nitrosodimethylaniline hydrochlorate and add it to 10.3 pounds of the soda salt of betanaphtholmonosulpho-acid, made acid with eleven pounds of glacial acetic acid. I then place this mixture on an oil-bath and raise the temperature to 110° centigrade, stirring all the while. As soon as the mixture thickens I raise the temperature to 121° centigrade, at which point there is an evolution of gas. As soon as this has ceased I remove the heat and pour the thick black molten mass into a cold dish or vessel, which, on cooling, solidifies into a solid substance of a metallic luster. I then dissolve this substance in boiling water, to which I add enough potash to make it strongly alkaline, at which point my new coloring-matter is thrown down as a brown precipitate, which I wash. It may be collected on a filter. It dissolves readily in water with a dark-purple color, which is immediately changed into a beautiful blue color by the addition of muriatic or sulphuric acid, and by the addition of permanganate of potash a brown precipitate is formed. By adding oxalic acid to the aqueous dark-purple solution the color is changed into blue. A reducing-agent—such as grape-sugar—added to an alkaline solution changes the color of the solution to a golden brown, which by oxidizing agents— such as an ammoniacal sulphate of copper— assumes a brown color. It dyes wool mordanted with an iron or an alum mordant with a dark purple color.

In the preparation of this compound I do not limit myself to the exact proportions of ingredients, as they may be varied without departing from the principle of my invention.

I am aware that compounds used as coloring-matters have been produced by the action of an acid solution of betanapthol or nitroso-dimethylaniline hydrochlorate.

What I claim as new, and desire to secure by Letters Patent, is—

A dark-violet coloring matter produced by the action of an acid solution of the soda salt of betanaphtholmonosulpho-acid up n nitroso-dimethylaniline hydrochlorate, substantially as described.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.